United States Patent [19]

Agostini

[11] Patent Number: 4,984,228
[45] Date of Patent: Jan. 8, 1991

[54] DUAL DRIVE CHANGER FOR RECORDS

[75] Inventor: Louis P. C. Agostini, Sint-Pieters-Leeuw, Belgium

[73] Assignee: Staar S. A., Belgium

[21] Appl. No.: 291,253

[22] Filed: Dec. 28, 1988

[30] Foreign Application Priority Data

Jan. 13, 1988 [BE] Belgium .............................. 8800040

[51] Int. Cl.[5] .............................................. G11B 17/24
[52] U.S. Cl. ........................................ 369/37; 369/198
[58] Field of Search ............... 369/197, 198, 283, 284, 369/286, 34, 35, 36, 38

[56] References Cited

U.S. PATENT DOCUMENTS

| | | | |
|---|---|---|---|
| 3,484,055 | 12/1969 | Raine | 369/37 |
| 3,852,819 | 12/1974 | Stoar | 360/92 |
| 3,938,190 | 2/1976 | Semmlow et al. | 360/72 |
| 4,286,790 | 9/1981 | Siryj et al. | 369/36 |
| 4,589,101 | 5/1986 | Schatteman et al. | 369/38 |
| 4,635,150 | 1/1987 | Kato et al. | 360/92 |
| 4,644,425 | 2/1987 | Tamaki | 360/69 |
| 4,701,899 | 10/1987 | D'Alayer de Costemor D'Arc | 369/38 |
| 4,706,233 | 11/1987 | D'Alayer de Costemor D'Arc | 369/33 |
| 4,742,504 | 5/1988 | Takasuka et al. | 369/36 |
| 4,752,920 | 6/1988 | D'Alayer de Costemor D'Arc | 369/33 |
| 4,791,626 | 12/1988 | Staar | 369/37 |
| 4,815,057 | 3/1989 | Miller et al. | 369/37 |

FOREIGN PATENT DOCUMENTS 235334 8/1961 Australia .
2116028 1/1976 Fed. Rep. of Germany .

Primary Examiner—Stuart S. Levy
Assistant Examiner—Kenneth B. Wells
Attorney, Agent, or Firm—Leydig, Voit & Mayer

[57] ABSTRACT

A changer for sequentially playing back at least two records without any interruption includes a magazine for storing records along a number of storage planes in side-by-side compartment and two mechanisms for transferring stored records to and from the magazine, and for playing back the records. The mechanisms are commonly movable relative to the magazine for alignment of one mechanism with a stored record while another record is being played back in the other mechanism.

22 Claims, 4 Drawing Sheets

DUAL DRIVE CHANGER FOR RECORDS

TECHNICAL FIELD

The present invention relates to changers for records, such as grooved or optically readable discs on which information is recorded. More particularly, the invention relates to changer apparatus including a magazine for storing a plurality of records and a mechanism for selecting records from the magazine, for retrieving recorded information from a selected record, and for returning the selected records to the magazine.

BACKGROUND ART

Various designs of apparatus for changing records, particularly in disc form, are known. The records employ a carrier or medium upon which information is stored for retrieval or playback. Typical examples of records include discs containing grooves of varying widths and depths for playback with a stylus, discs encoded for optical retrieval of information, such as compact discs and video discs, and other analogue and digitally encoded records. Information retrieval from records of particular interest to the invention is accomplished by rotating the record about a central axis and detecting a signal, such as an electrical signal or reflected light, that is converted to a useful information form.

In known changers, a record is selected from a library of records, some part or all of the information stored on the record is retrieved, and the record is returned to the library. Subsequently, a second record is selected, the desired information on that record is located and retrieved, and that record is returned to the library. Because of the construction of typical changers for records, there is an interruption or "dead time" between sequential information retrievals or playbacks from different records. The interruption begins at the end of information retrieval from a record, continues while that record is being returned to the library, while a new record is being selected from the library, and until the new record reaches its playback speed and the information desired to be retrieved is located on the record.

In audio and/or video record applications, the dead time prevents continuous retrieval of information from different records. Cross-fading from one record to another cannot be achieved. In data retrieval applications, valuable time is lost as a computer or other apparatus to which information is being supplied waits while records in the playback mechanism are being changed.

Several designs have been proposed to reduce the dead time between sequential information retrievals from separate records. For example, in Belgian Patent No. 898,775 a changer apparatus includes an annular magazine in which records are stored. A mechanism for selecting records from the magazine, for returning records to the magazine, and for playback of records is mounted on a circular plate within, and having a central axis coincident with that of, the magazine. Rotation of the plate positions the record selection and return apparatus opposite a selected disc for its retrieval and playback. However, some dead time occurs between the ending of playback of one record and the beginning of the playback of a second record. During that dead time, the first record is returned to one position in the magazine and the second record is selected from a different position in the magazine.

In a changer for magnetic tape cassettes disclosed in West German Auslegeschrift No. 21 16 028, playback mechanisms are provided on opposite sides of a magazine that rotates about a generally horizontal axis. That arrangement permits the selection of a cassette and the cueing of the tape in that cassette by one of the playback mechanisms while the other playback mechanism is retrieving information from a previously selected cassette. That changer avoids dead time interruptions between sequential information retrievals, but its design is difficult to apply to discs. Magnetic tape cassettes may be conveniently fitted with notches or other engaging means to aid selection, whereas circular discs cannot be similarly notched. Moreover, the circular shape of discs implies that a disc changer analogous to the German application tape cassette player would occupy a large volume. In that analogue, space for three side-by-side discs (one in each playback mechanism and one in the interposed magazine) would be required. Further, the cassette disclosed in the German patent publication is not suitable for use with discs. In a magazine rotating about a horizontal axis like that in the publication, discs are presented without discrimination between sides, and discs could be displaced from the magazine during rotation of the magazine about its axis.

DISCLOSURE OF THE INVENTION

It is, therefore, an object of the invention to provide a simple changer for records, particularly for discs, that is free of dead time and has a size that does not exceed the outside dimensions of a magazine for storage of records.

Another object of the invention is to provide a changer employing a plurality of similar components to achieve reduced manufacturing costs.

The aims of the invention are achieved in a changer including a magazine for storing a plurality of records along a number of planes. The novel changer includes two mechanisms for transferring records from the magazine, for playing back the transferred records to retrieve recorded information, and for returning the records to the magazine. The mechanisms and magazine are movable relative to each other. In one embodiment, the magazine is annular and the mechanisms are oppositely disposed for receiving and discharging records at opposed locations within the magazine. In that embodiment, the records are all disposed tangent to a circle concentric with the central axis of the magazine. The magazine includes storage slots for storing records generally tangent to the circle concentric with the central axis of the magazine. In that embodiment, the mechanisms are preferably mounted within the annular magazine. In another embodiment, the records are stored in a plurality of generally parallel storage planes.

The operation of the playback mechanisms is independent from their positioning relative to the magazine. In operation, the transfer and playback mechanisms are positioned so that a first record is transferred to the playback mechanism in a record transfer plane, and information retrieval is begun. While the first playback mechanism is in operation, the second playback mechanism is positioned opposite a magazine slot containing a desired second record. That second record is transferred from the magazine to the playback mechanism and cued to the location of the information desired to be retrieved from the second record. At the conclusion of the information retrieval from the first record, information retrieval from the second record begins, the first mechanism is aligned with the magazine position of the first record, and the first record is returned to the magazine during the playback of the second disc. Thereafter, the process just described continues. The continual process avoids dead time interruptions between sequential information retrievals.

Additional features and advantages of the invention will become evident from the following detailed description of a preferred embodiment of the invention. Various additions and modifications within the spirit of the invention will occur to those of skill in the art. Accordingly, the scope of the invention is not limited by the described preferred embodiment.

The invention may be more easily understood by reference to the drawing figures in which like elements are given the same reference numbers.

BEST MODE FOR CARRYING OUT THE INVENTION

Figure 1:
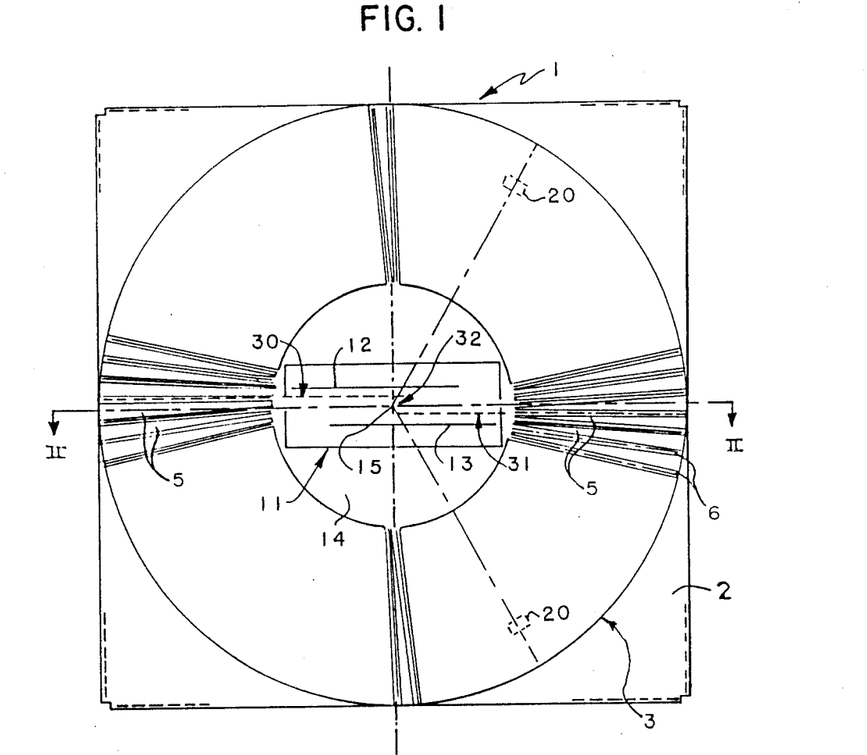
FIG. 1 is a schematic plan view of an embodiment of a changer apparatus according to the invention.
Figure 2:
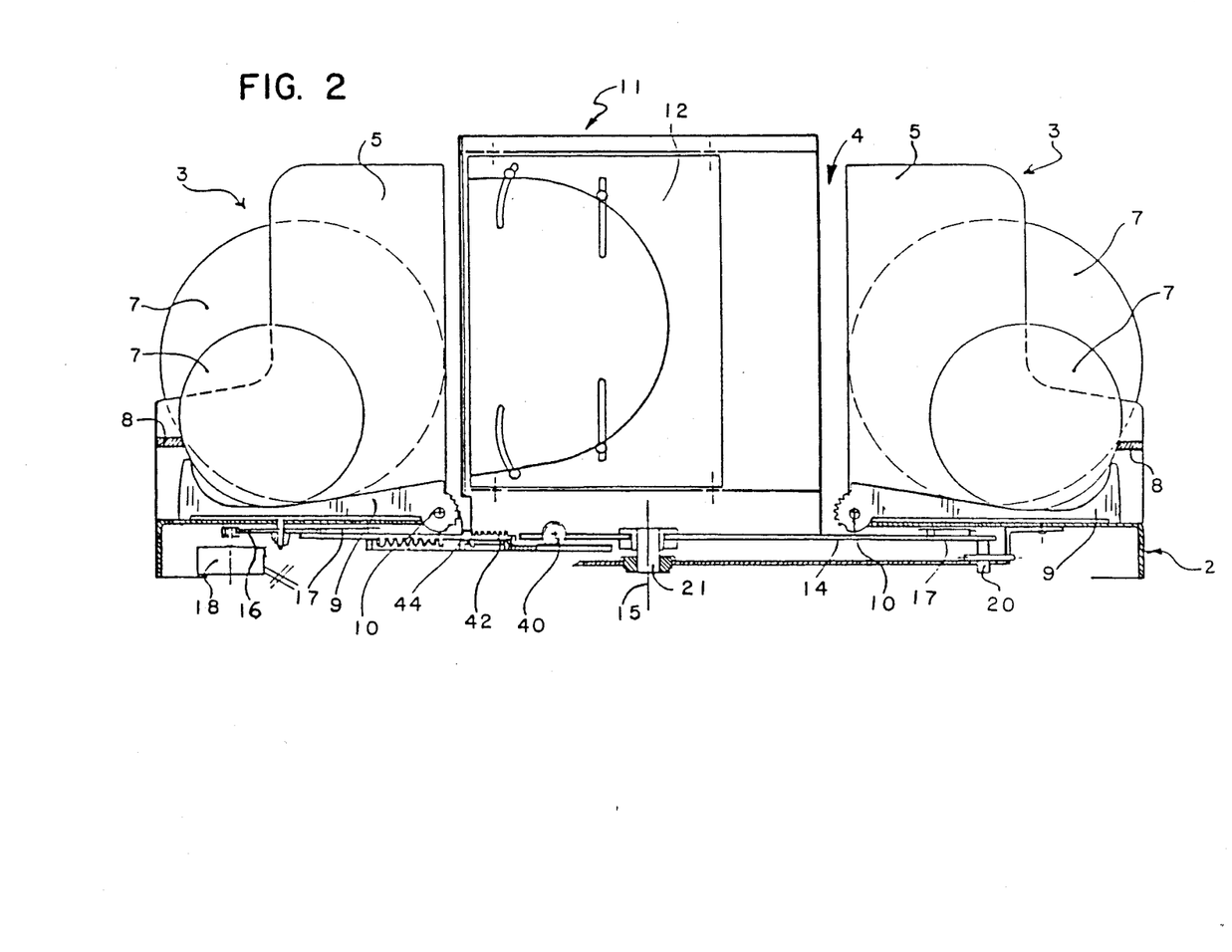
FIG. 2 is a sectional side view of the apparatus of FIG. 1 taken along its line II—II.

A preferred embodiment of a changer 1 for records according to the invention is shown in schematic plan and sectional side views in FIGS. 1 and 2, respectively. The changer includes a supporting frame 2 on which an annular magazine 3 is disposed for storage of records. The magazine 3 has a central opening 4. The magazine also includes a plurality of generally radially disposed walls 5 that are generally perpendicular to the supporting frame 2. A slot or compartment 6 is defined by and between each adjacent pair of the walls 5 in which a record, particularly in the form of a disc 7, may be stored. Each slot 6 is open toward the inside, the outside, and the top of the annular magazine 3. The walls 5 are generally trapezoidal in shape. With that wall shape, the discs 7 within the slots 6 are partially exposed at the outside of the magazine 3 so that they may be manually inserted and removed. The discs 7 may be mechanically transferred out of the magazine 3 through the opening in each slot 6 that is adjacent the inside of the magazine in preparation for playback. The discs 7 may be compact discs of either the conventional three inch or five inch size. In a preferred embodiment of the changer, discs of different sizes may be loaded into the same magazine and played back in any desired sequence.

The discs 7 are disposed in the magazine 3 so that gravity urges them toward the outside of the magazine. Between each adjacent pair of walls 5, at the outside of the magazine 3, a stop 8 is provided for retaining discs within the slots 6. The stop 8 prevents rolling of the discs beyond the outside of the magazine 3. A lever 9 having a hook-like end is disposed on the supporting frame 2 of the magazine in each slot 6 for retaining a disc recording 7 in each of the slots 6 and for transferring the disc out of its slot. The lever 9 is shown in FIG. 2 in its storage position in contact with the frame 2. The lever 9 is pivotally attached to a pin 10 opposite the hook-like end of the lever. The pin 10 is mounted proximate the central opening 4 of the magazine 3. The lever 9 rotates about the pin 10 when it transfers a disc out of a slot 6 toward the central opening 4 of the magazine 3.

Dual mechanisms 11 for receiving and loading transferred records, for playing back, i.e., retrieving information from records, and for ejecting records are disposed within the central opening 4 of the annular magazine 3. The mechanisms 11 include playback units 12 and 13 commonly mounted on a circular plate or base 14 that is rotatable relative to the magazine 3 about a central axis 15. The axis 15 is also the central axis of the magazine 3. The playback units 12 and 13 may be of a conventional construction for receiving a disc edgewise, for engaging the disc with a drive means, for rotating the disc, for retrieving information from the rotating disc, and for ejecting the disc after playback. An example of such a playback unit is described in U.S. Pat. No. 4,546,396, the disclosure of which is incorporated herein by reference. The playback units 12 and 13 may be of the type that accommodates discs of different sizes, such as 80 mm and 120 mm diameter compact discs. An example of a mechanism of the latter type is disclosed in U.S. Pat. No. 4,498,162, the disclosure of which is also incorporated herein by reference. Still another playback mechanism accepting discs of different sizes and suitable for use in the invention is described below in connection with FIGS. 4A, 4B, and 4C.

Through the relative rotation of the magazine 3 and the plate 14, the playback units 12 and 13 may be positioned so that one of them aligns with a slot 6 containing a desired record. In the embodiment illustrated, the plate 14 is rotated about the axis 15 by a gear 16 that engages an annular rack 17 that is mounted on the top side of the plate 14 on which the mechanisms 11 are mounted. The gear 16 is driven by an electric motor 18 that is mounted on the frame 2. Rollers 20 support the plate 14 and allow it to rotate around the axis 15 or a journalled spindle 21 in response to the turning of the motor 18.

In a preferred embodiment, the playback units 12 and 13 and the walls 5 are arranged so that a record can be transferred to either unit from any slot 6. Preferably, as shown in FIG. 1, the playback units 12 and 13 are mounted in opposition; that is, the openings of playback units 12 and 13 for receiving a disc are disposed at opposed locations at the inside of the annular magazine 3. Preferably the playback units 12 and 13 are substantially parallel to each other, i.e., the planes of records being played back in the units are generally parallel to each other. Those planes are preferably laterally spaced, i.e., are not coplanar, so that the playback units 12 and 13 at least partially overlap each other.

Figure 3:
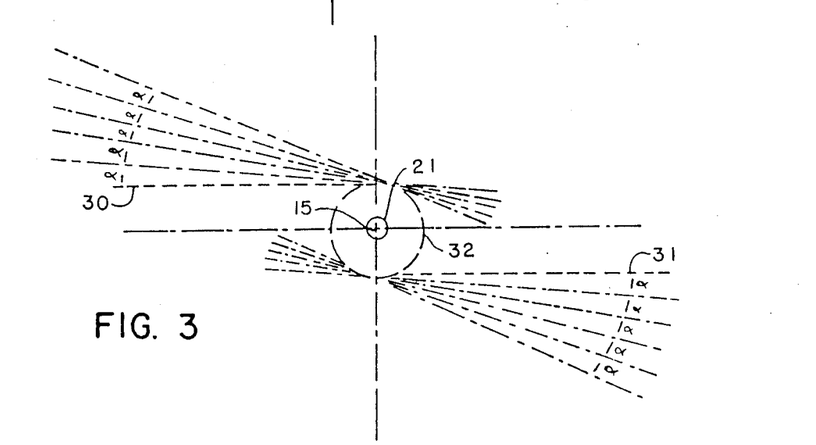
FIG. 3 is a schematic diagram illustrating the arrangement of slots in a magazine for use with the invention.

The playback units 12 and 13 are disposed symmetrically with respect to the central axis 15 of the rotating plate 14 and the magazine 3. The openings of the playback units 12 and 13 are disposed tangent to a circle that is concentric with the axis 15 and the spindle 21 on which the plate 14 is mounted. It follows that the walls 5 and the slots 6 are likewise disposed tangent to the same circle that is concentric with the central axis. This arrangement is schematically illustrated in FIG. 3. There, the transfer planes of the playback units 12 and 13 for receiving and returning records are illustrated as lines 30 and 31, respectively, these transfer planes being generally parallel to, but laterally spaced from each other. Furthermore, in this preferred embodiment, those lines are tangent to a circle 32 that is concentric with the spindle on which the plate 14 is mounted.

(Circle 32 is included in FIG. 3 solely for clarity of explanation and is not a structural element.) The planes in which the discs are stored are aligned with the transfer planes along which the playback units 12 and 13 receive and eject the discs at the various alignments of the slots 6 and the playback unit.

The spacing between the walls 5 is determined by the thickness of the records to be stored between them and the desired capacity of a magazine. That spacing results in a sector angle α for each of the slots 6. For example, the sector angle α may be four degrees. The paths followed by selected recordings as they are selected from, and returned to, the slots 6 lie along a series of lines that lie generally tangent to the circle 32 and that are successively angularly separated by the angle α beginning from the planes 30 and 31, respectively. By employing that spacing arrangement, any record stored in the magazine can be selected from its slot by either of the playback units 12 or 13.

In the preferred embodiment, changer operation is controlled electrically through a microprocessor according to a programmed set of instructions. The novel changer following the instructions avoids dead time interruptions between successive retrievals of information from different records. The records may be compact discs, video discs, acoustic sound recordings, magnetic discs, or other types of records. In order to explain operation of the changer, it is assumed that each record is a compact disc having a plurality of tracks (e.g., A, B ... Y, Z, AA, BB ... FF, GG) and is stored in a numbered slot (e.g., slots 200 to 290) in a magazine. As an example, suppose the desired sequence of operation requires the playback of track BB from a compact disc stored in slot 210, followed by the playback of track H of a disc stored in slot 280 and concluded by the playback of track Z from a disc stored in slot 235. The sequence of operation begins with the application of an appropriate electric signal to the motor 18, which may be a stepper motor, to turn the plate 14 so that a playback unit 12 is aligned with the slot 210. (In the embodiment described, the playback units are rotated and the magazine is stationary. In an alternative embodiment, the playback units are stationary, reducing their potential vibration, and the magazine is rotated.) Upon achievement of that desired alignment, a motor 40 associated with the playback unit 12 and mounted on the plate 14 is actuated. The motor 40 engages a toothed rack 42 and drives it radially outward relative to the axis 15. The extended rack 42 engages complementary cogs 44 disposed on a circular end of the lever 9 proximate the pin 10. The extension and engagement of the rack 42 rotates the hook-like end of the lever 9 about the pin 10 toward the axis 15 of the magazine 3. The hook-like end of the lever 9 engages the aligned disc and transfers it from the slot 210 into the playback unit 12. The motor 40 is then reversed, retracting the rack 42 toward the axis 15, so that the lever 9 returns to its rest position as shown in FIG. 2. Preferably simultaneously, the playback unit 12 engages the aligned disc, locates track BB and begins the retrieval of the information recorded at that track.

Next, the microprocessor sends an appropriate signal to the motor 18 to rotate the plate 14 (to turn the playback units or the magazine 3) to align the playback unit 13 with the slot 280 of the magazine 3. When that alignment has been achieved, while the disc in the first playback unit 12 continues its playback, the motor associated with the second playback unit 13 (not shown but corresponding to the motor 40 of the first playback unit 12) is actuated, causing the transfer of the aligned disc from the slot 280 into the second playback unit 13. The second playback unit 13 cues the aligned disc to the track H and then pauses. Meanwhile, the transfer lever in the slot 280 has been returned to its rest position. The microprocessor controls the acceleration and deceleration of the plate 14 where the playback units are rotated during the second slot alignment and disc transfer to avoid shock or vibration that might interfere with the simultaneous operation of the first playback unit 12.

Upon completion of the playback of the track BB from the first loaded disc, the standby or pause status of the second loaded disc is released and playback of that disc begins. Under control of the microprocessor, the plate 14 is then rotated again so that the first disc can be returned to the slot 210. After the alignment of the first playback unit 12 and the slot 210, the playback unit ejects the disc which rolls back into the slot 210 by gravitational force. When that transfer has been completed, the microprocessor proceeds to the next set of instructions which direct the first playback unit 12 to become aligned with the slot 235 for the loading of the third disc from which information is to be retrieved. The disc from the slot 235 is transferred to the first playback unit 12. The track Z is cued and paused until the playback on the second playback unit 13 is completed. Thereafter, the process continues in the same manner.

Alternatively, after transfer of the second disc to the second playback unit 13, the first playback unit 12 may be again aligned with the slot 210. At the conclusion of the information retrieval from the track BB, the first playback unit 12 ejects the first disc directly into the slot 210 without any delay because the first playback unit 12 has already been brought into alignment with the slot 210. The second playback unit 13 is simultaneously released from its paused status and information retrieval from the second selected disc is begun. After return of the first disc to the slot 210, the first playback unit 12 is aligned with the slot 235, and the disc in that slot is transferred to the first playback unit 12. While the track Z is cued and paused, the plate 14 is rotated to align the second playback unit 13 with the slot 280 in preparation for the return of the disc being played to that slot. The alternative process continues thereafter in the same manner.

Continual operation of the changer to retrieve records and playback selected portions of the records is accomplished according to the described or similar processes. Information is continuously retrieved from any of the records in any desired sequence without any interrupting dead time between retrievals. By mounting the two playback units 12 and 13 within the central opening of the annular magazine 3, the dimensions of the changer do not have to exceed the outside dimension of the magazine 3. Further, by mounting the two playback units 12 and 13 in overlapping opposition, as shown in FIG. 1, the dimension of the central opening 4 of the magazine 3 can be minimized. Alternatively, if space permits, the openings of the playback units 12 and 13 for receiving disc records can be diametrically opposed or can be radially disposed, forming an acute angle.

The dual drive changer apparatus described with reference to FIGS. 1-3 employs a preferred annular magazine. Because of the relative thinness of the records and the relatively large number of storage compartments or slots in an annular magazine, each record in the magazine is generally, although not precisely, parallel to many of its neighbors. Other magazine configurations in which records are stored in generally parallel planes may also be employed in the invention. For example, a magazine could include a plurality of side-by-side slots for storing records. All the planes of storage of records in each magazine section are substantially parallel. In that arrangement, the two playback units would preferably be disposed opposite the magazine. The magazine and playback units would be relatively movable for the transfer of any record from a magazine to the aligned transfer playback unit. Other geometrical arrangements of magazines can also be employed in accordance with the invention.

Regardless of the configuration of the magazine, records are selected from the magazine and transferred to the playback units in the same planes in which they are stored in the magazine. In the preferred playback units, such as the one described in detail below, the records are played back by being rotated in a plane that is generally parallel to the plane in which the record is stored. When the magazine rotates relative to the playback units, the plane of the record relative to the original storage plane may change, but the playing back takes place in a plane generally parallel to the original storage plane.

As noted above, the playback units 12 and 13 can have the construction shown in U.S. Pat. Nos. 4,498,162 and 4,546,396. In addition, the structure of another playback unit, similar to that disclosed in U.S. Pat. No. 4,546,396 is shown in front, top, and end views in FIGS. 4A, 4B, and 4C. In all of those figures, the same elements are given the same reference numbers. The arrow A in FIG. 4A indicates the direction of insertion of a disc in the playback unit. After a disc has been inserted in the unit, it is transported toward the playback position in the direction of arrow A, by a motor and gears that drive a carriage. During this movement, the edge of the disc is engaged by two first pairs of pins which are mounted on pivoted levers for handling and properly centering the disc. As the centered disc approaches the playback position, a third pair of pins, the separation of which is determined by the diameter of the disc, slidably engage oblique edges of openings in a fixed rear wall. The sliding of that third pair of pins releases the engagement between the first pairs of pins and the disc so that the disc is free to rotate and to be played back. Ejection of a disc consists of the same steps but taken in the opposite sequence. The two first pairs of pins engage the disc as it leaves the playback position because the third pair of pins slides, now in the opposite direction from the earlier sliding, along the oblique edges of the openings in the rear wall. That engagement centers the disc until the carriage travels to its original insertion position. When that original position is reached, the engagement of the two first pairs of pins with the disc is again released so that the disc can be ejected from the playback unit.

Figure 4A:
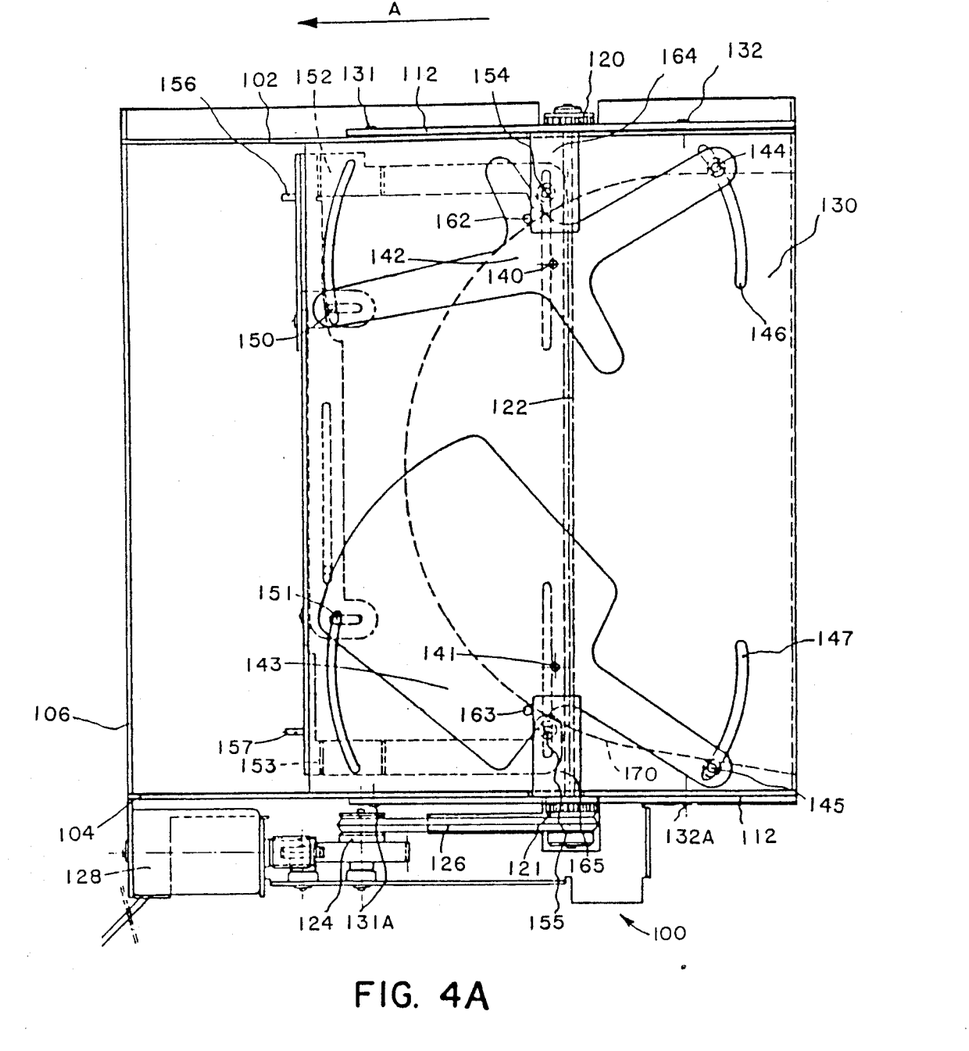
FIGS. 4A, 4B, and 4C are, respectively, front, top, and end views of an embodiment of a disc playback unit that can be used in the invention.
Figure 4B:
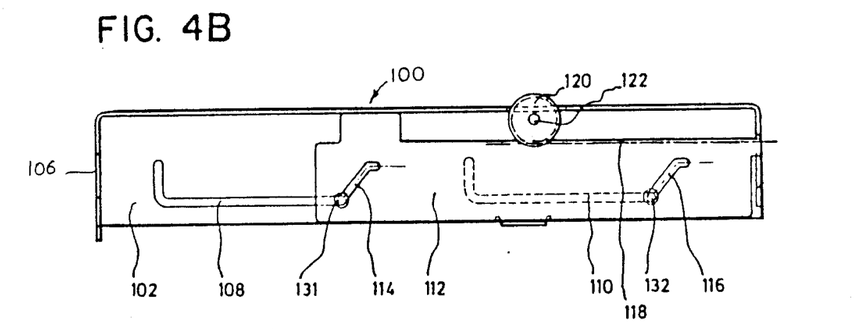
Figure 4C:
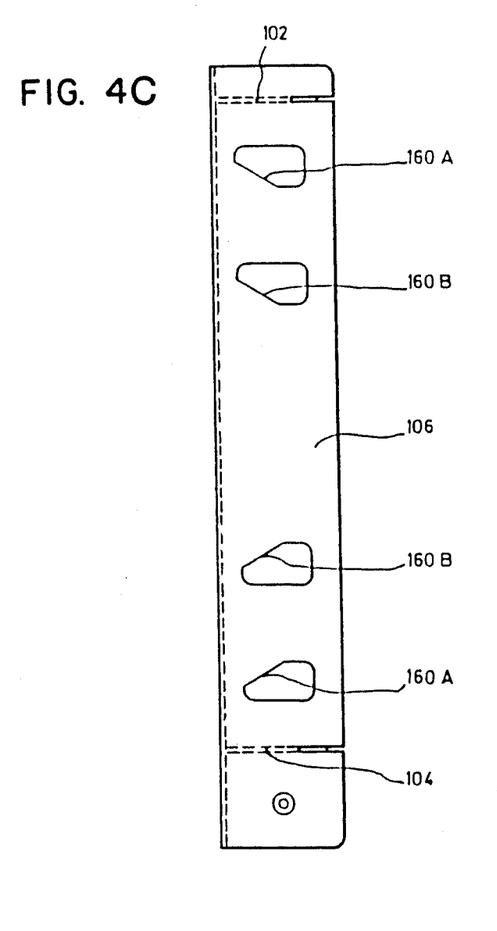

The playback unit of FIGS. 4A, 4B, and 4C is shown in the insertion position. The playback unit has a supporting frame 100 used to mount the unit, for example, on the plate 14 of the changer 1. The frame includes two opposed side walls 102, 104 and a rear wall 106 that is transverse to the side walls. After a disc is inserted into the playback unit, it is transported toward the rear wall 106 in the direction of arrow A of FIG. 4A.

Only side wall 102, which is shown in FIG. 4B, is described in detail since the side walls 102 and 104 are similar in structure. The side wall 102 includes two similar slots 108 and 110, each generally having an L shape. A carriage that transports a disc between the insertion and playback positions includes a pair of sliding supports. One of the sliding supports is disposed adjacent each of the side walls 102 and 104. The sliding support 112 adjacent the right side wall 102 includes two oblique slots 114 and 116 and, on an edge, a rack 118 for engaging a gear 120. The sliding support, slot, and rack structure at the side wall 104 is symmetrical with that at the side wall 102. The sliding support at the side wall 104 includes a rack engaging a second gear 121. The gears 120 and 121 are mounted on opposite ends of a shaft 122 that is driven through a pulley 124 and a belt 126 by an electric motor 128. The motor 128, which is mounted on the frame 100, can turn the pulley 124 in either direction. When the gears 120 and 121 are driven, they engage the respective racks on the pair of sliding supports. As a result, the disc recording carriage, including the pair of sliding supports, is also driven and moves toward or away from the rear wall 106 depending on whether a disc is being inserted into or ejected from the playback unit.

The disc recording carriage also includes a housing 130 joined to the sliding supports at the side walls 102 and 104. Four pins 131, 131A, 132, and 132A that slidably engage the slots in the sliding supports and the side walls 102 and 104, respectively, are fixedly mounted to side walls (not shown) extending from the housing 130 and disposed adjacent the side walls 102 and 104. For example, as shown in FIG. 4B, the pin 131 passes through the slot 108 in the side wall 102 and the slot 114 in the sliding support 112 adjacent the side wall 102. The pin 132 passes through the slot 110 in the side wall 102 and the slot 116 in the sliding support 112 adjacent the side wall 102. At the opposite side of the playback unit, the pins 131A and 132A respectively pass through the pairs of slots in the side wall 104 and the sliding support that is adjacent the side wall 104. Those pairs of slots at the side wall 104 are similar to and symmetrical to the slot pairs 108, 114 and 110, 116. Because of these sliding engagements and the shape of the slots, a disc is received by the housing 130 when the carriage is in its insertion position.

In that insertion position, the discs are received and ejected in the same planes in which they are stored. When the gears 120 and 121 are turned to move the disc in the direction A toward its playback position, the carriage and an inserted disc are moved toward the rear wall 106. When the disc approaches the playback position, the disc and the housing 130 are translated, generally perpendicular to the plane of the disc, to the playing position for engagement with a spindle that turns the disc. The spindle engagement and disengagement movements are achieved through the shape of the pairs of slots engaged by the pairs of pins. Likewise, when a disc recording is ejected, the gears 120 and 121 turn in the opposite direction, first translating the disc to disengage it from a driving spindle, then moving it away from the rear wall 106 to eject it from the playback unit.

The housing 130 includes two transverse pins 140 and 141 around which two complexly shaped levers 142 and 143 can respectively pivot near their respective centers. The first lever 142 has a cruciform shape with four extending fingers. The second lever 143 has a paddle shape with one extending finger and a relatively large oppositely extending trapezoidal shaped portion. The levers 142 and 143 respectively have transverse fingers that extend away from the rear wall 106 and respectively include pins 144 and 145 that respectively slidably engage the arcuate slots 146 and 147 in the housing 130. The lever 142 is biased by means, such as a spring (not shown), to pivot about the pin 140. In the orientation preferred in the invention, because of the trapezoidal shape, lever 143 is rotated counterclockwise, as viewed in FIG. 4A, by the force of gravity. The pins 144 and 145 are thus urged inwardly, toward the side walls 104 and 102, respectively. The portions of the levers 142 and 143 disposed on the opposite side of the pins 140 and 141 from the pins 144 and 145 are thus urged outwardly, toward the side walls 102 and 104, respectively. At those opposite ends of those levers, toward the rear wall 106, the levers 142 and 143 respectively include pins 150 and 151 that slidably engage the respective arcuate slots disposed in the housing 130 toward the rear wall 106 and that are connected to levers 153 and 152 respectively.

Symmetrical levers 152 and 153 are respectively disposed proximate the side walls 102 and 104 beyond the housing 130 and are, therefore, shown in phantom in FIG. 4A. The levers 152 and 153 slide along the surface of the housing 130 along the rear wall 106 and the bottom wall. The levers 152 and 153 move pins 154 and 155 which engage respectively in their slots. The pins 154 and 155 also protrude through the housing 130 for engagement with the edge of a disc for loading and ejection in the manner described below. The pins 156 and 157 protrude from the levers 152 and 153, respectively, from the rear of the carriage toward the rear wall 106.

After a disc is loaded into the playback unit, the carriage is moved toward the rear wall 106 by the motor 128. When the pins 156 and 157 reach rear wall 106, they each engage and cooperate with one of the two pairs of openings formed in the rear wall 106 and shown in FIG. 4C. Each of the paired openings includes an oblique edge 160A or 160B that may be engaged by one of pins 156 and 157. The pair of openings that is engaged depends upon the separation of the pins 156 and 157. That separation is determined by the diameter of the disc recording that is inserted in the playback unit. As the pins 156 and 157 slide along the oblique edges 160A or 160B of one of the pair of openings, their separation, and the separation of the pins 154 and 155 increases. That increased spacing ensures pivoting of the lever 143 against gravity and lever 142 against the biasing force of the spring, spreading the pins 144, 145 and 154, 155 apart. That spreading releases contact with the disc that has been inserted so that the disc may freely rotate for playback. When the carriage moves away from the rear wall 106, the engagement between the disc and the pins is restored in preparation for ejection of the disc. As the carriage moves opposite direction A of FIG. 4A, the spacing between the pins 156 and 157 decreases as they slide along the oblique edges 160A or 160B of one of the pairs of openings. As the pins 156 and 157 disengage from the edges of the slots 160A or 160B, they allow enough rotation of the levers 142 and 143 to re-establish engagement of the pins 144, 145, 154, 155 with the edge of a disc recording.

In these loading and ejection operations, a disc is disposed in the housing 130. The pins 162 and 163 that project from levers 142 and 143, respectively, cooperate with the arms 164 and 165 that project inwardly from the side walls 102 and 104, respectively. As viewed in FIG. 4A, levers 142 and 143 are urged to rotate counterclockwise and clockwise, respectively, so that pins 144, 145, 154, and 155 are positioned as shown in FIG. 1 for insertion of a disc. When a disc is rolled into the housing 130 by pivoting of a lever 9, its edge follows an arcuate surface 170 of the housing, shown in phantom lines in FIG. 4A, because of its position. As the housing 130 moves in the direction of arrow A, the pins 162 and 163 are moved away from their abutment against the arms 164 and 165 so that levers 142 and 143 rotate due to their respective rotational biasing forces. That rotation causes the pins 144, 145, 154, and 155 to remain in contact with the edge of the disc and hold the disc for transportation to the playback position. When a disc is being ejected, the pins 162 and 163 come to rest against the arms 164 and 165, releasing the grip of the pins 144, 145, 154, 155 on the disc. Because of the inclination of the lower part of the surface 170, released discs roll out of the player mechanism on edge and back into a storage compartment of the magazine driven solely by the force of gravity.

When two sizes of discs are to be accommodated in a playback unit, two pairs of openings in rear wall 106 are provided for engagement of the pins 156 and 157. In that case, the levers 152 and 153 will be spread to one of two possible spacings by each of the two disc sizes. A playback unit for a single disc size requires only one pair of openings for engaging the pins 156 and 157. More than two different sizes of discs can be accommodated by providing additional pairs of openings.

While emphasis has been placed on a changer employed with disc records, such as compact discs, other types of records, including cassettes and even magnetic tapes, can be employed in the invention provided an appropriate transfer and cueing means is supplied.

The changer embodiment described employs many common components, simplifying manufacture and reducing cost. The magazine includes identical, multiple walls and transfer lever assemblies. The playback units are preferably identical and can accommodate discs of various sizes. Thus, the novel changer is useful in a large number of applications because of its flexibility, its relatively small size, and its low cost.

I claim:

1. A changer for sequentially playing back recorded information from at least two selected records comprising:

a magazine for storing records along each of a plurality of storage planes;

first and second transfer and playback mechanisms having record transfer planes which are spaced laterally and are generally parallel to each other;

means for mounting said magazine and said first and second mechanisms, respectively, for relative movement, different ones of the storage planes of said magazine being aligned with said mechanisms as said mechanisms and said magazine move relative to each other, to align the storage plane of a selected record with the record transfer plane of one of said mechanisms while another previously selected record is being cued or recorded information thereof is being played back in the other of said mechanisms in order that records may be played back sequentially without any interruption.

2. The changer of claim 1 wherein said, first and second transfer and playback mechanisms are disposed side-by-side and opposite said magazine.

3. The changer of claim 1 wherein said first and second playback mechanisms are independent in operation from said second and first transfer means, respectively, for sequentially retrieving information from different records without interruption.

4. The changer of claim 1 including a plurality of transfer levers pivotally mounted in said magazine for transferring recordings from said magazine to said first and second playback mechanisms.

5. The changer of claim 4 wherein each of said first and second transfer mechanism includes a gear driven by an electric motor for engaging and pivoting a selected one of said levers to transfer a record from said magazine to the respective playback mechanism.

6. The changer of claim 1 wherein said magazine is annular and has a central axis, the storage planes of said magazine being disposed tangent to a circle concentric with said axis and said first and second transfer means are commonly rotatable relative to said magazine about said central axis.

7. The changer of claim 6 wherein said annular magazine includes a central opening and said first and second transfer and playback means are disposed within said opening.

8. The changer of claim 6 wherein the record transfer planes of said first and second transfer mechanisms, respectively are generally tangentially disposed relative to said circle.

9. The changer of claim 8 wherein said magazine includes storage slots for storing records, said slots containing the storage planes and being generally tangentially disposed relative to said circle.

10. The changer of claim 7 wherein said magazine comprises a plurality of walls disposed generally tangentially relative to said circle, adjacent pairs of said adjacent walls forming slots therebetween for receiving records.

11. The changer of claim wherein said first and second transfer playback mechanisms are disposed so that the record transfer planes are symmetric relative to said central axis.

12. A changer for sequentially playing back recorded information from at least two selected records comprising:
an annular magazine for storing records along each of a plurality of storage planes, said magazine having a central axis, the storage planes of said magazine being tangent to a circle concentric with said axis;
first and second transfer and playback mechanisms having record transfer planes which are spaced laterally and are generally parallel to each other;
means for mounting said magazine and said first and second mechanisms, respectively, for relative movement, different ones of the storage planes of said magazine being aligned with said mechanisms as said mechanisms and said magazine move relative to each other, to align the storage plane of a selected record with the record transfer plane of one of said mechanisms while another previously selected record is being cued or recorded information thereon is being played back in the other of said mechanisms in order that records may be played back sequentially without any interruption, said means for mounting including a plate rotatable relative to said magazine on which said first and second transfer and playback mechanisms are fixedly mounted.

13. The changer of claim 12 wherein said plate is disposed within said central opening of said annular magazine.

14. The changer of claim 12 including an electric motor for rotating said plate to align said first and second transfer and playback mechanisms with preselected storage planes of said magazine.

15. The changer of claim 14 wherein said motor comprises a stepper motor.

16. The changer of claim 1 wherein a record is played back in each playback mechanism in a plane generally parallel to the record transfer plane of the corresponding transfer mechanism.

17. A changer for sequentially retrieving recorded information from at least two selected records comprising:
a magazine having a plurality of storage compartments, each of said compartments having means for storing a record in a storage plane;
first and second playback mechanisms mounted opposite said magazine and having record transfer planes which are spaced laterally and generally parallel to each other, said first and second mechanisms and said magazine being relatively movable to align said transfer planes of each mechanism with compartments of said magazine for transfer and return of a record moving edgewise in the storage plane between one of said mechanisms and a compartment in said magazine; and
means for transferring stored records to said mechanisms from aligned compartments of said magazine, for retrieving recorded information from transferred records, and for returning transferred records to compartments of said magazine.

18. The changer of claim 17 wherein said magazine is annular and said storage compartments are radially arranged about a central section of said magazine having an axis, each of the storage planes lying tangent to a circle concentric with the central section axis, said playback mechanisms are mounted in the central section, and said magazine is rotatable about the axis of the central section.

19. The changer of claim 17 wherein a record is played back in one of said playback mechanisms, in a plane generally parallel to transfer plane the compartment in which the record was stored.

20. A changer for sequentially playing back recorded information from at least two selected records comprising:
a magazine for storing records along each of a plurality of side-by-side compartments in which records are carried in storage planes;
first and second loading, unloading, and playback mechanisms having record transfer planes which are spaced laterally and are generally parallel to each other;
means for mounting said magazine and said first and second mechanisms, respectively, for relative movement, the storage planes of successive side-by-side compartments being aligned with the record transfer plane of at least one of said first and second mechanisms as said magazine and said mechanisms move relatively to align any stored record with one of said mechanisms while another previously selected record is being cued or recorded information thereon is being played back in the other of said first and second mechanisms so that any stored record can be selected from said magazine and transferred to either of said first and second mechanisms in order that records may be played back sequentially without any interruption.

21. A changer for sequentially playing back recorded information from at least two selected records comprising:
- an annular magazine for storing records along a plurality of storage planes, the magazine having a central axis and a central opening, each of the storage planes being tangential with respect to a circle centered on the central axis;
- first and second transfer and playback mechanisms disposed inside the central opening of the magazine and having record transfer planes which are tangential to the circle; and
- means for producing relative rotation of the said magazine and the first and second mechanisms to bring each of the record transfer planes into alignment with one of the record storage planes.

22. A changer for sequentially playing back recorded information from at least two selected records comprising:
- an annular magazine for storing records along a plurality of storage planes, the magazine having a central axis and a central opening, each of the storage planes being tangential with respect to a circle centered on the central axis;
- first and second transfer and playback mechanisms disposed inside the central opening of the magazine and having record transfer planes which are parallel and laterally spaced from each other, and
- means for producing relative rotation of the magazine and the first and second mechanisms to bring each of the record transfer planes into alignment with one of the record storage planes.

* * * * *

UNITED STATES PATENT AND TRADEMARK OFFICE
CERTIFICATE OF CORRECTION

PATENT NO.  : 4,984,228

DATED       : January 8, 1991

INVENTOR(S) : Louis P. C. Agostini

It is certified that error appears in the above-identified patent and that said Letters Patent is hereby corrected as shown below:

```
Column 10, line 63, change "thereof" to --thereon--;
   "    10, line 66, delete ",".
Column 11, line 39, after "claim" insert --7--.
```

Signed and Sealed this

Twenty-eighth Day of July, 1992

Attest:

DOUGLAS B. COMER

Attesting Officer

Acting Commissioner of Patents and Trademarks